(12) United States Patent
Boccara et al.

(10) Patent No.: US 9,025,150 B2
(45) Date of Patent: May 5, 2015

(54) METHOD AND DEVICE FOR HIGH RESOLUTION FULL FIELD INTERFERENCE MICROSCOPY

(75) Inventors: Albert Claude Boccara, Paris (FR); Fabrice Harms, Orsay (FR); Bertrand Le Conte Chrestien de Poly, Paris (FR)

(73) Assignee: LLTech Management, Paris (FR)

( * ) Notice: Subject to any disclaimer, the term of this patent is extended or adjusted under 35 U.S.C. 154(b) by 257 days.

(21) Appl. No.: 13/698,738

(22) PCT Filed: May 17, 2011

(86) PCT No.: PCT/EP2011/057997
§ 371 (c)(1),
(2), (4) Date: Jan. 10, 2013

(87) PCT Pub. No.: WO2011/144632
PCT Pub. Date: Nov. 24, 2011

(65) Prior Publication Data
US 2013/0107268 A1    May 2, 2013

(30) Foreign Application Priority Data
May 18, 2010  (FR) .................... 10 53833

(51) Int. Cl.
*G01N 21/00* (2006.01)
*G01B 9/02* (2006.01)
*G01B 9/04* (2006.01)
*G02B 21/00* (2006.01)
*G02B 26/06* (2006.01)

(52) U.S. Cl.
CPC .. *G01B 9/02* (2013.01); *G01B 9/04* (2013.01); *G02B 21/0056* (2013.01); *G02B 26/06* (2013.01); *G01B 9/02091* (2013.01); *G01B 9/02082* (2013.01); *G01B 9/02068* (2013.01)

(58) Field of Classification Search
CPC ........... G01B 9/02091; G01B 2290/45; G01B 9/0209; G01B 9/02044; G01B 9/02079; G01B 11/2441; G01B 9/02002; G01B 9/02008; G01B 9/02045; G01B 9/02083; G01B 2290/70; G01B 9/02007; G01B 9/0201; G01B 9/00
See application file for complete search history.

(56) References Cited

U.S. PATENT DOCUMENTS

| | | | | |
|---|---|---|---|---|
| 6,480,285 | B1 * | 11/2002 | Hill | 356/492 |
| 7,623,908 | B2 * | 11/2009 | Boppart et al. | 600/477 |
| 8,054,468 | B2 * | 11/2011 | de Boer et al. | 356/479 |

FOREIGN PATENT DOCUMENTS

| | | |
|---|---|---|
| EP | 1 626 257 A1 | 2/2006 |
| FR | 2 817 030 A1 | 5/2002 |

(Continued)

OTHER PUBLICATIONS

International Search Report issued in PCT/EP2011/057997 mailed Sep. 23, 2011 (3 pages).

(Continued)

Primary Examiner — Michael P Stafira
(74) Attorney, Agent, or Firm — Osha Liang LLP (57) ABSTRACT

The invention relates to an incoherent light full field interference microscopy device for the imaging of a volumetric scattering sample (106). The device comprises an interference device (100) between a reference wave (401), produced by reflection of an incident wave by a reflective surface (105) of a reference arm of the interference device, and an object wave (402) produced by backscattering of the incident wave by a slice of the sample, an acquisition device (108) for at least a first interference signal and at least a second interference signal resulting from the interference of the reference and object waves, the at least two interference signals having a phase difference, an processing unit (403) for calculating an image of the slice of the sample, based on said interference signals. The interference device also comprises an optical element (404) for modifying the phase of the wavefront, and the microscopy device comprises a control unit (405) for the optical element, linked to the processing unit (403), the optical phase modification element being controlled by optimizing a statistical parameter of at least a part of the image calculated by the processing unit.

14 Claims, 4 Drawing Sheets

(56) References Cited

FOREIGN PATENT DOCUMENTS

| | | |
|---|---|---|
| FR | 2 865 370 A1 | 7/2005 |
| WO | 02/40937 A1 | 5/2002 |
| WO | 2004/055473 A1 | 7/2004 |

OTHER PUBLICATIONS

Written Opinion issued in PCT/EP2011/057997 mailed Sep. 23, 2011 (7 pages).

Extracts for "Full-field Optical Coherence Tomography" by A. Dubois and A.C. Boccara, from the book "Optical Coherence Tomography—Technology and Applications", Wolfgang Drexler and James G. Fujimoto (Eds.), 2008 (6 pages).

"Image based adaptive optics through optimisation of low spatial frequencies", Delphine Debarre, Martin J. Booth and Tony Wilson, Optics Express, Jun. 25, 2007, vol. 15, No. 13, pp. 8176-8190 (15 pages).

"Optimum deformable mirror modes for sensorless adaptive optics", Biru Wang and Martin J. Booth, Optics Communications 282 (2009), Aug. 7, 2009, pp. 4467-4474 (8 pages).

\* cited by examiner

METHOD AND DEVICE FOR HIGH RESOLUTION FULL FIELD INTERFERENCE MICROSCOPY

PRIOR ART

1. Technical Field

The present invention relates to a method and a device for high resolution full field interference microscopy, notably for cell imaging.

2. Prior Art

Figure 1:
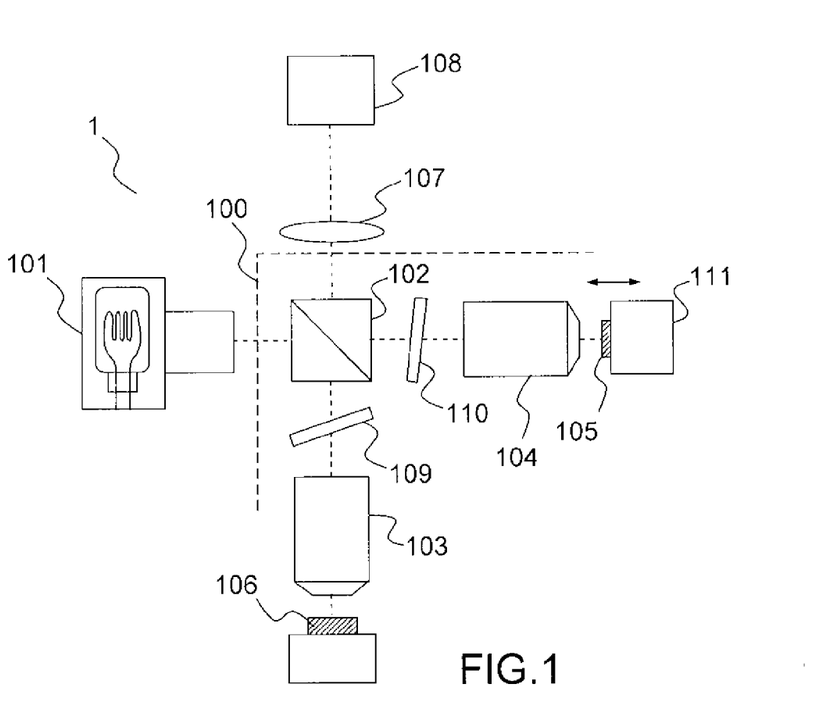
FIG. 1 (described above) is a schematic diagram of a low-coherent light full field interference microscope according to the prior art.

FIG. 1 is a schematic diagram of an incoherent light full field interference microscope, or optical coherence full field microscope, based on an imaging method also known as full field OCT (where OCT is the abbreviation of the term "Optical Coherence Tomography"). This imaging method is described, for example, in the article "Full-field optical coherence tomography" by A. Dubois and C. Boccara, taken from the book "Optical Coherence Tomography—Technology and Applications", edited by Wolfgang Drexler and James G. Fujimoto, Springer 2009. Microscopy based on full field OCT in low-coherent light is also described in French patent application FR 2 817 030.

The device 1, as illustrated in FIG. 1, is based on a Michelson interferometer 100 illuminated by a low coherence length source 101, such as a halogen lamp. The interferometer comprises a beam splitter element 102, such as a non-polarizing beamsplitter cube, forming two arms, and two identical microscope objectives 103 and 104 are located in these two arms. A device of this kind is called a Linnik interferometer. In one of the arms, referred to below as the reference arm, there is a flat surface 105 having uniform reflectivity, placed in the object focal plane of the microscope objective 104. In the other arm, referred to below as the object arm, there is a three-dimensional diffusing sample 106 for which the three-dimensional map of the backscattering amplitude is to be reconstructed. At the exit from this interferometer, an achromatic doublet lens with a large focal length, typically 300 mm, is used to conjugate the object focal planes of the two objectives on a multichannel sensor 108, such as a CCD camera. In order to benefit from a transverse resolution limited by diffraction, the focal length of this lens is chosen so as not to subsample the point spread function (PSF) of the objectives. Glass plates 109, 110 are provided in each arm to compensate for dispersion.

Since the light source 101 has a short coherence length, interference between the light reflected by the reference surface 105 and that backscattered by the sample 106 only occurs when the optical paths in both arms are equal, to within the effective coherence length. There is therefore a virtual slice through the object, called the coherence slice, for which the backscattering information is relative to the interference figure seen by the camera. Since the backscattered light on both sides of this slice is not coherent with the light reflected by the reference, it contributes to a global background in the signal. When the path length difference of the two arms of the interferometer is modulated by an axial displacement of the reference surface 105 by means of a piezoelectric stage 111, only the interference figure carrying the information of the coherence slice is modulated, while the background remains constant. Different interference figures can be recorded by synchronizing this modulation with the camera imaging. By means of a non-linear combination of the images, the information relating to the coherence slice can then be demodulated, and thus the information relating to the ballistic photons backscattered exclusively by this slice can be discriminated from the information relating to those which have been diffused elsewhere in the sample. Since the intensity recorded in each pixel of the camera contains a constant term and a modulated term, which is itself composed of an amplitude and a phase, at least three interference figures must theoretically be recorded in order to extract the complex amplitude of the modulated term. These three phases of the signal are chosen within a modulation period, and therefore the amplitude of the displacement of the reference surface does not exceed the central half-wavelength of the effective spectrum of the instrument. A full field tomographic image can then be acquired in the volume of the sample, and the three-dimensional information can be recorded by displacing the sample with respect to the coherence plane. Reconstructions in all directions, or other three-dimensional representations, can then be produced.

Thus the use of full field interference microscopy makes it possible to use a light source having a spectral band of more than 300 nm, centred at approximately 750 nm for example, to obtain an anatomopathological spatial resolution corresponding to a cellular resolution (about 1 micron in the three dimensions), up to 1 millimeter in depth in living tissue. For that purpose, both objectives 103 and 104 are generally immersion microscope objectives, for example water immersion objectives (water having a refractive index, n, of 1.33), with suitable correction of geometric and chromatic aberrations.

In order to maintain an accuracy of 1 micron in X, Y and Z at the requisite depth it is necessary to have a homogenous medium (pure water) with a fixed optical index to maintain the equality of optical paths between the reference arm and the measurement (object) arm of the interferometer, in both dimensions (over the whole analysis surface).

When a biological tissue is analysed, it will be seen that, on the one hand, the macroscopic optical index is rarely equal to that of water (being generally greater), while, on the other hand, it varies locally both transversely and in depth, depending on the biological structures to be analysed. For conventional mechanical or frequency scanning OCT, these effects are less obvious because the numerical aperture is small, as these systems operate with a large depth of field, of the same order as the depth being explored.

The applicant has shown that, in full field OCT microscopy, when working at high resolution (a resolution of 1 micron in all three dimensions), these effects of loss of resolution become substantial at depths in the range from 20 to 200 microns, depending on the biological tissues to be observed.

One object of the present invention is to improve the image resolution, and consequently the depth of analysis. For this purpose, the invention proposes the controlled modification of the wave plane in two dimensions in the object arm of the interferometer to correct the deformation of the wave front in the biological medium due to local variations in index of the different cells through which the light beam passes. To achieve this, the invention proposes a new controlled adaptive optics (AO) approach based on the statistical properties of the OCT signal.

SUMMARY OF THE INVENTION

In a first aspect, the invention relates to a device for the incoherent light, full field interference microscopy of a volumetric scattering sample, comprising:
  a source for emitting an incident wave in a given spectral band,
  an interference device to provide optical interferences between a reference wave, produced by reflection of the incident wave by a reflecting surface of a reference arm of the interference device, and an object wave produced by backscattering of the incident wave by a slice of the sample at a given depth of said sample, when the sample is placed in an object focal plane of a microscope objective placed in an object arm of the interference device, a device for the multichannel acquisition of at least a first interference signal and at least a second interference signal resulting from the optical interference of the reference and object waves, the at least two interference signals having a phase difference produced by varying the relative path length difference between the two arms of the interference device, said multichannel acquisition device being placed in an plane optically conjugated with said object focal plane of said microscope objective of the object arm, and a processing unit for calculating an image of the slice of the sample based on said interference signals.

According to said first aspect of the invention, the interference device also comprises an optical element for modifying the phase of the wavefront of one of the object or reference waves, and the microscopy device comprises a control unit for the optical element, linked to the processing unit, the optical phase modification element being controlled by optimizing a statistical parameter of at least a part of the image calculated by the processing unit.

In a preferred embodiment, the optical phase modification element is positioned in the object arm, allowing the phase of the wave incident on the sample to be controlled.

In a variant, the interference device comprises a microscope objective in each of the arms, and the optical phase modification element is positioned on a pupil or an image of the pupil of the microscope objective of the object arm.

In a variant, the optical phase deformation element is a deformable mirror.

In a variant, the calculation of the image of the slice of the sample comprises the subtraction of at least two interference signals having a phase difference of it and the optical phase modification element is controlled by optimizing the standard deviation measured on at least some of the values of the points of the calculated image.

In a variant, the calculation of the image of the slice of the sample additionally comprises the calculation of the absolute value of the aforementioned subtraction, and the optical phase modification element is controlled by optimizing the mean, the standard deviation or the contrast measured on at least some of the values of the points of the calculated image.

In a variant, the optimization of the statistical parameter comprises the measurement of the parameter for three states of the optical phase modification element corresponding to the introduction of three respective given values of an optical aberration.

In a variant, the interference device is of the Linnik type, comprising a beam splitter element for forming the object and reference arms, and a microscope objective in each of the arms.

In a variant, the interference device comprises a variable density in one of its arms and plate in the other arm to compensate the path length difference introduced by the variable density.

In a second aspect, the invention relates to a method for the incoherent light full field interference microscopy of a volumetric scattering sample, comprising the emission of an incident wave in a given spectral band, interference between a reference wave, produced by reflection of the incident wave by a mirror of a reference arm, and an object wave produced by backscattering of the incident wave by a slice of the sample at a given depth of said sample, the sample being placed in an object focal plane of a microscope objective placed in an object arm of the interference device. It also comprises the acquisition of at least a first interference signal and at least a second interference signal resulting from the interference of the reference and object waves, using a multichannel acquisition device placed in a plane optically conjugated with said object focal plane of said microscope objective of the object arm, the at least two interference signals having a phase difference produced by varying the relative path length difference between the two arms of the interference device, the processing of the first and second interference signals for the calculation of an image of the slice of the sample, and the control of the phase of the wave incident on the sample by the optimization of a statistical parameter of at least a part of the image calculated on the basis of the processing of the interference signals.

In a variant, the calculation of the image of the slice of the sample comprises the subtraction of at least two interference signals having a phase difference of it and the phase of the wave incident on the sample is controlled by optimizing the standard deviation measured on at least some of the values of the points of the image.

In a variant, the calculation of the image of the slice of the sample additionally comprises the calculation of the absolute value of the aforementioned subtraction, and the phase of the wave incident on the sample is controlled by optimizing the mean, the standard deviation or the contrast measured on at least some of the values of the points of the image.

In a variant, the control of the phase of the wave incident on the sample comprises, for a given optical aberration, the measurement of a given number of values of the statistical parameter after the introduction of the same number of values of the optical aberration into the phase of the wave incident on the sample, where the calculation of the value of the aberration maximizes the value of the parameter, and the introduction of the value of the aberration into the phase of the wave incident on the sample.

In a variant, the number of values of the optical aberration introduced is three.

BRIEF DESCRIPTION OF THE DRAWINGS

Other advantages and characteristics of the invention will become clear in the light of the description, illustrated by the following figures.

DETAILED DESCRIPTION

The present invention proposes an original method of interference microscopy with adaptive optics, which uses a distinctive statistical property of the images acquired by the full field OCT imaging method during the exploration in depth of diffusing media, related to the random nature of the signals.

Figure 2:
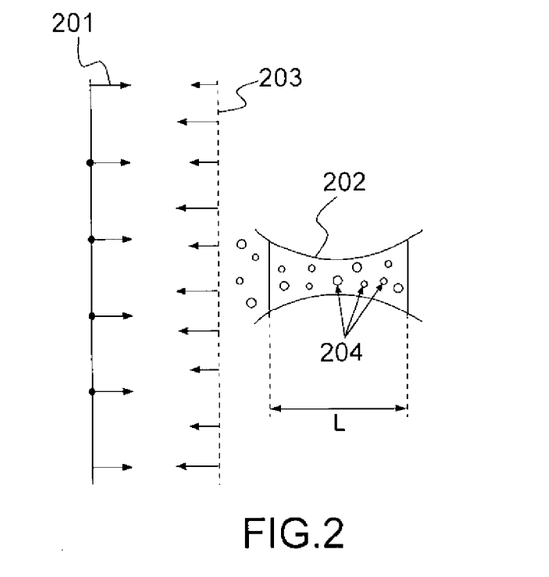
FIG. 2 is a diagram explaining the origin of the random nature of an OCT signal.
Figure 3A:
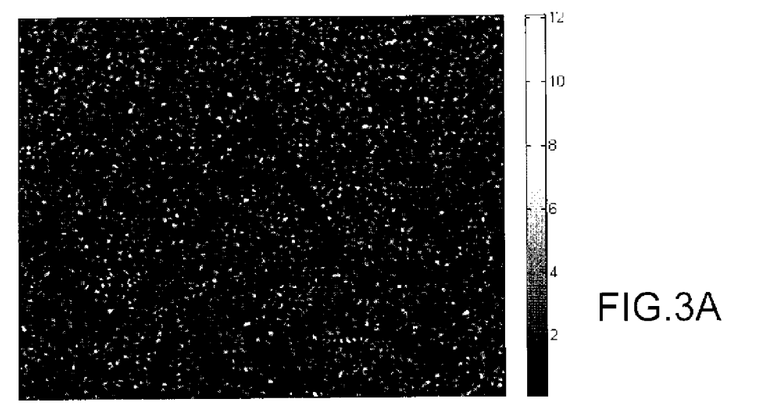
FIGS. 3A to 3C are three images representing, respectively, a speckle pattern, the superimposition of 16 uncorrelated speckle patterns, and the superimposition of 100 uncorrelated speckle patterns.

The origin of the random nature of a full field OCT signal is explained schematically in FIG. 2. The incident wave 201 is focused in an elementary volume, or voxel, of the sample 202. The cross section through the voxel in the absence of aberrations is given by the diffraction spot of the microscope objective 103. The slice from which the backscattered wave is returned, corresponding to the length of the voxel, has a thickness L equal to the temporal coherence length of the source divided by twice the refractive index of the medium. The backscattered wave 203 is the sum of wavelets backscattered by the structures 204 which have random positions in the voxel in question. The backscattered wave is detected by interference with the reference wave, not shown here. The random nature of the structures forming the sample gives the OCT images a speckled appearance. The term "speckle" is commonly used to denote the laser granularity observed when a diffusing object is illuminated by a highly coherent laser. In this case, the described phenomenon is of a different kind, but it can be represented mathematically in both cases by a random path in the complex plane (see for example Goodman, "Speckle phenomena in optics", Roberts and Company Publishers, Oct. 30, 2006). An image affected by speckle is shown in FIG. 3a. Speckle generally has a special property in the distribution of intensities. The contrast, which is equal to the ratio of the standard deviation to the mean of the distribution of intensities, is equal to unity.

As a general rule, the users of OCT microscopy try to eliminate speckle from images as far as possible, by smoothing the distribution of intensities, often to the detriment of the resolution. In spite of this, the applicant has shown that it is possible to make use of the random nature of the OCT image and of speckle to implement an adaptive optics method.

On one hand, because of the random local reflection properties of the samples studied, the applicant has shown that an intensity image of the sample can be obtained with only two interference figures with a phase difference of π, produced for example by two positions of the reference mirror. The image is then calculated by finding the difference (or the modulus of the difference) between the two interference signals, thus suppressing the background while retaining the essential statistical properties of the image.

Additionally, the geometric aberrations introduced by the macroscopic heterogeneities of the penetrated structures which are much larger in size than the microscopic structures of the diffusers cause an expansion of the focal spot of the incident wave in the sample. The image is then the product of the convolution of the ideal image, free of aberrations, by the diffusion spot resulting from the presence of aberrations. If the spot occupies a surface corresponding to that occupied by N grains of speckle, the convolution of the ideal image by the diffusion spot is a matter of superimposing a number N of uncorrelated speckles, resulting in a division of the contrast by the square root of N.

Figure 3B:
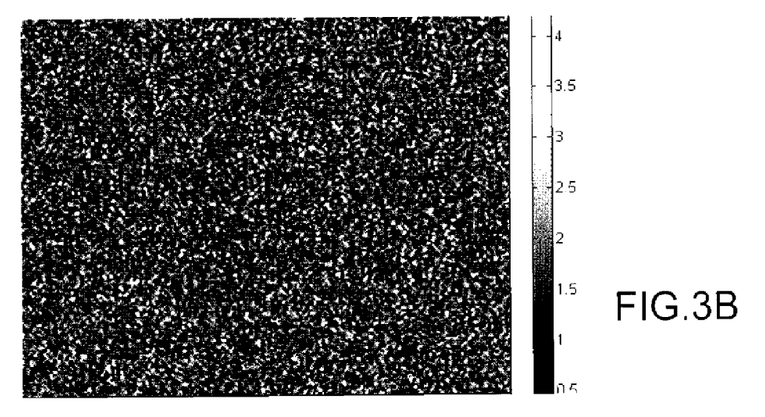
Figure 3C:
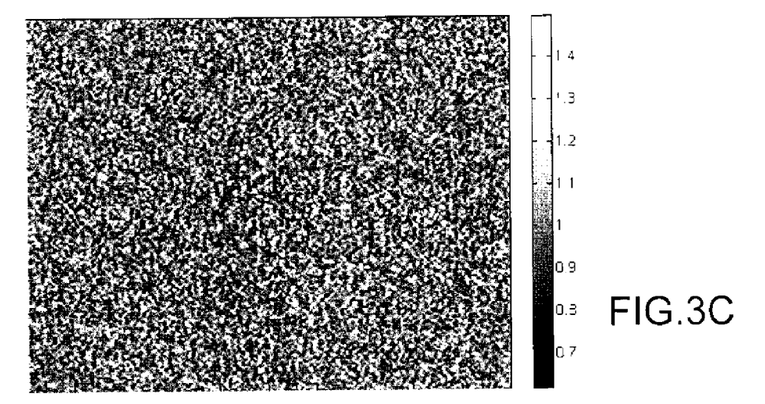

By way of example, FIGS. 3b and 3c show the superimposition of 16 and 100 uncorrelated speckles. It is easy to verify by calculation on these images that the contrast, defined as the ratio between the standard deviation and the mean calculated on the distribution of intensities, is indeed 0.25 and 0.1 respectively.

The resulting OCT signal is thus directly related to the presence of aberrations. The statistical parameters of the image are affected by the presence of the aberrations. This is because the convolution of the "ideal" image by the focusing spot decreases the value of the statistical parameters of the image such as the standard deviation or the mean intensity.

The invention comprises the introduction of a variable correction of the wavefront incident on the sample, in order to correct some or all of the aberrations introduced by the macroscopic heterogeneities of the structures in the sample. This variable correction is controlled by optimizing one of the statistical parameters of the image of the slice of the sample which is obtained.

Figure 4:
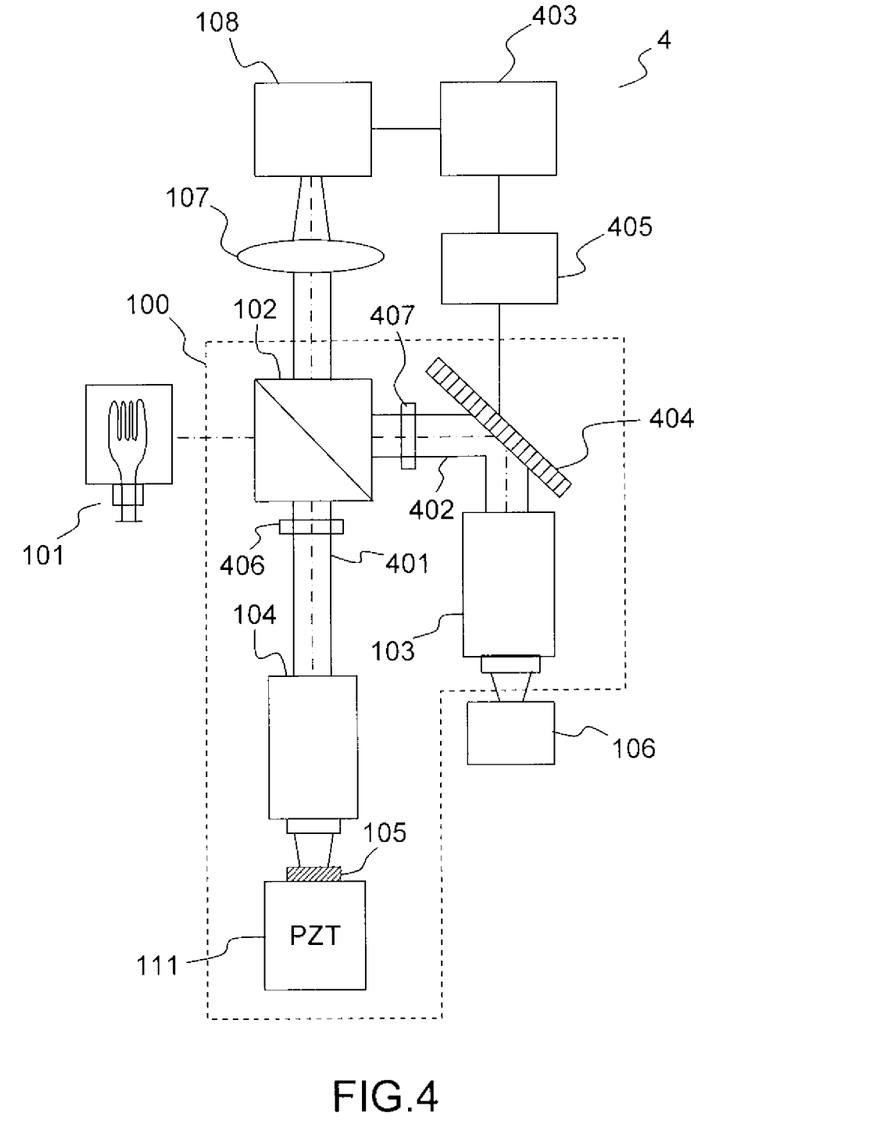
FIG. 4 shows an exemplary embodiment of a full field interference microscope according to the invention.

FIG. 4 shows an exemplary embodiment of an interference microscope according to the invention.

The device 4 of the example shown in FIG. 4 is based on the use of a Linnik interferometer 100 as described in FIG. 1. Identical elements are indicated by the same references. The device comprises, notably, a source 101 for the emission of an incident wave with low spatial and temporal coherence. This is, for example, a halogen lamp with a spectral band above 300 nm, conventionally used as a cold light illumination source in microscopy (see, for example the KL1500 LCD—Cold Light Source produced by Olympus). The interferometer 100 comprises a reference arm with a microscope objective 104 and a reference mirror 105 mounted on a piezoelectric stage 111 and an object arm with a microscope objective 103 identical to the objective 104. The objectives can be, for example, objectives with a medium numerical aperture (of about 0.4), designed to operate in an infinity/focal point combination, with wide spectrum chromatism correction (such as the UMPLFLN-W immersion series produced by Olympus). The incident wave emitted by the source 101 is separated, by a beamsplitter cube 102 for example, to form a reference wave 401 reflected by the reference mirror in the reference arm and an object wave 402 backscattered by a slice of a sample 106 mounted, for example, on a stage of the reference arm. At the exit from the interferometer, an achromatic doublet lens is used to conjugate the object focal planes of the two objectives on a two-dimensional multichannel acquisition device 108, such as a CCD camera. This optical system is chosen in such a way that the magnification obtained by the combination of the objective and this doublet lens provides correct sampling by the detector pixels of the diffraction spot of the objective, at a rate of at least two pixels per diffraction spot according to Shannon's theorem. The typical focal lengths vary from 300 to 500 mm according to the aperture of the objectives and the size of the camera pixels. As described previously, since the light source 101 has a short coherence length, interference between the light reflected by the reference surface 105 and that backscattered by the sample 106 only occurs when the optical paths in both arms are equal to within the effective coherence length. By varying the relative path-length difference between the two arms of the interferometer by means of the stage 111, a phase difference is introduced between the interference signals resulting from the interference between the reference wave and the object wave. Thus, typically, in order to apply a phase difference of π in the Linnik configuration, a movement of $\lambda_0/4n$ must be applied to the reference mirror (where n is the index of the propagation medium facing the reference mirror and $\lambda_0$ is the mean wavelength of the emission source, typically in the region of 750 nm).

The device 4 also comprises an interference signal processing unit 403 for calculating an image of the slice of the sample.

According to one aspect of the invention, the interference device 100 comprises an optical element for modifying the phase of the wavefront, and the device 4 comprises a unit 405 for controlling the optical element, linked to the processing unit 403.

The optical phase modification element is, for example, a deformable mirror of the continuous or segmented membrane type or a liquid crystal matrix. A deformable mirror such as the Mirao52e model (produced by Imagine Eyes, Paris, France) with 52 actuators placed under a reflective deformable membrane may be suitable.

Advantageously, the optical phase modification element is placed in the object arm of the interferometer. This makes it possible to correct the aberrations of the object wave related to the heterogeneities of the structure in the sample in order to obtain an object wave having an optical quality comparable to the reference wave, thus providing a gain in resolution.

Advantageously, the optical phase modification element is positioned in an entrance pupil of the microscope objective 103 of the object arm or an image of the pupil, in order to keep the beam centred on this element for all points in the field.

The various aberrations contributing to an enlargement of the diffusion spot may be associated with deformations of the wavefront which can be expressed on the basis of orthogonal polynomials, enabling the level of an aberration present to be modified without affecting the level of the other aberrations. These polynomials are known as Lukosz polynomials, and are described, for example, in the article by D. Debarre and others, "Image Based Adaptive Optics Through Optimisation of Low Spatial Frequencies", Optics Express (2007), vol. 15 (13), pp. 8176-8190. Other decompositions of the wavefront can be used, such as that described in the article by B. Wang and others, "Optimum deformable mirror modes for sensorless adaptive optics", Optics Communications 282 (2009), 4467-4474. The orthogonal base described uses the intrinsic deformation modes of the deformable mirror in question to construct a representation base for the aberrations having the same properties as the Lukosz polynomials, but making a better allowance for the real deformations of the deformable mirror. The most commonly encountered aberrations are defocus aberration, spherical aberration, introduced for example by a plate with a parallel flat face positioned on the focusing path of a microscope objective, such as a microscope plate, and coma.

An object of the present invention is therefore to cancel out the effect of each of the aberrations contributing to the degradation of a statistical parameter of the OCT signal resulting from the acquisition of an image of the slice of the sample.

In an example, the image is calculated by finding the difference between two interference signals having a phase difference of $\pi$ (these two signals being obtained by varying the relative path-length difference between the two arms of the interferometer, for example by moving the piezoelectric stage), or by finding the mean of a given number of images calculated in this way. The mean value of the points of the image calculated in this way is zero in this case. Conversely, the standard deviation ($\sigma$), given by:

$$\sigma^2 = \frac{1}{M \times N} \sum_{x=1}^{M} \sum_{y=1}^{N} (I(x, y) - m_1)^2$$

where I(x, y) is the value of a point of the image with the coordinates (x, y), M and N are the respective numbers of the points of the image in the two dimensions and $m_1$ is the mean, is not zero, and decreases in the presence of aberrations, because of the summations of uncorrelated speckles, as described above.

In an example, the level of each of the aberrations which is to be cancelled is varied by means of the control unit 405 and by specific operation of the wavefront modification element 404, by optimizing the calculated value of the standard deviation. The applicant has shown that, in general, three measurements for each aberration to be corrected are sufficient to achieve the objective, owing to the properties of the chosen orthogonal polynomials. This is because the variation of the image quality according to the intrinsic statistical parameters of the OCT signal as described above can be represented in quadratic form, and in particular the maximum of this curve of variation can be approximated by a parabola. For each aberration, it is then possible, starting from three values of the parameter in question obtained by means of the control unit 405 by a specific operation of the wavefront modification element 404 corresponding to each aberration considered, to reconstruct the parabola which is the best representation of this variation and to deduce the optimal value of the aberration from this. By repeating this optimization process for each aberration, it is possible to deduce the optimal control parameters for the phase modification element 404, in other words the form of the wavefront by means of which the image obtained can be optimized by compensating the defects introduced along the optical path.

In another example, the image is calculated by taking the absolute value of the difference of two interference signals having a phase difference of $\pi$, or by finding the mean over a given number of images calculated in this way. In this case, a statistical parameter characteristic of the image can be, for example, the mean value of the points of the image, the standard deviation, or the contrast which is equal to the ratio of the standard deviation to the mean.

In a variant, and notably if the field is wide, it is possible to operate on one part of the image only. This is because it is possible that a "mean" correction made on the entire image may not be optimal for the whole field. In this case, it is preferable to operate on part of the image only, or even to make a number of successive corrections on various parts of the image and then recombine these different images.

In a variant, a variable optical filter 406 can be provided in one of the arms of the interferometer, for example the reference arm. The purpose of the optical filter is to adjust the relative luminous intensity of the reference and object waves. This is because the applicant has shown that the optimal interference signal, and consequently the optimal image contrast, is obtained when the relative luminous intensity of the two arms is substantially equivalent. Using this system, the OCT signal which is obtained can be optimized by an adaptive device which allows for the variations in reflectivity from different biological samples. The luminous intensity of the arm of the interferometer in question can be optimized, for example, by using a set of different and interchangeable optical filters, care being taken to include a means in the other arm of the interferometer for compensating the path length difference and dispersion introduced by the filter in question, such as a transparent plate with a flat parallel face 407, made of the same material and having the same thickness as the filter in question.

Figure 5A:
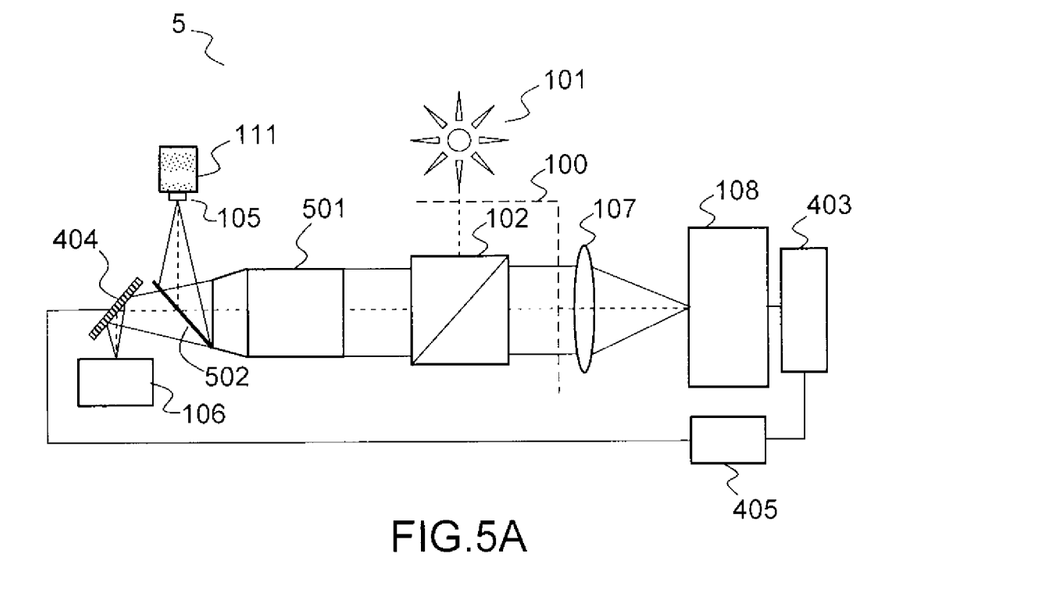
FIGS. 5A and 5B show two other exemplary embodiments of a full field interference microscope according to the invention.
Figure 5B:
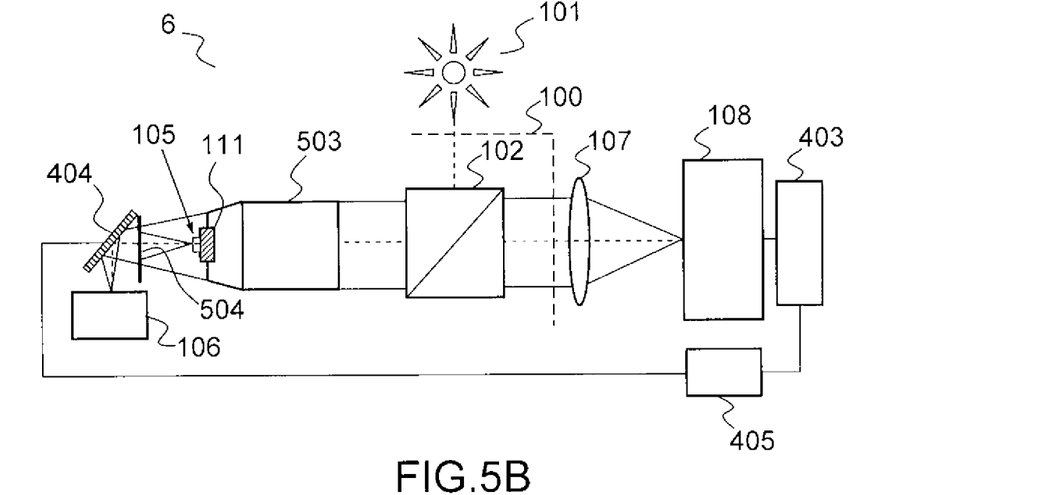

FIGS. 5A and 5B show two variant embodiments of a full field interference microscope according to the invention. FIG. 5A shows an interference microscope 5 based on a Michelson interferometer 100, and FIG. 5B shows an interference microscope 6 based on a Mirau interferometer 100. In these two drawings, elements identical to the assembly shown in FIG. 4 are indicated by the same references.

In the example of FIG. 5A, the interferometer 100 comprises a single microscope objective 501 and a beamsplitter plate for forming the reference arm containing the reference mirror 105 and the modulation element 111 of the mirror, and the object arm containing the sample 506 and the optical phase modification element 404. An advantage of this device is that it enables a single objective to be used, thus minimizing the differential aberrations between the two arms of the Linnik interferometer described above.

In the example of FIG. 5B, the interferometer 100 comprises a single microscope objective 503 at the exit of which the reference mirror 105, mounted on the translation stage 111, is mounted, and a semi-reflecting plate 504 for forming the reference arm and the object arm in which the sample 506 and the optical phase modification element 404 are located. As in the preceding case, this device uses a single objective.

Although it has been described by means of a certain number of detailed exemplary embodiments, the interference microscopy device and the method according to the invention incorporate other variants, modifications and improvements which will be evident to a person skilled in the art, such other variants, modifications and improvements being considered to lie within the scope of the invention as defined by the following claims.

The invention claimed is:

1. An incoherent light full field interference microscopy device for the imaging of a volumetric scattering sample, comprising:
  a source for emitting an incident wave having a given spectral band;
  an interference device comprising a reference arm and an object arm, to provide optical interference between a reference wave obtained by reflection of the incident wave on a reflective surface of the reference arm and an object wave obtained by the backscattering of the incident wave by a slice of the sample at a given depth of said sample, when said sample is placed in an object focal plane of a microscope objective placed in the object arm;
  a device for multichannel acquisition of at least a first interference signal and at least a second interference signal resulting from the optical interference of said reference and object waves, the at least two interference signals having a phase difference produced by varying the relative path length difference between the two arms of the interference device, said device for multichannel acquisition being placed in a plane optically conjugated with said object focal plane of said microscope objective of the object arm; and
  a processing unit for calculating an image of the slice of the sample based on said first and second interference signals, wherein
  the interference device additionally comprises an optical element for modifying the phase of the wavefront of one of said reference or object waves, and
  the microscopy device comprises a control unit for the optical element, linked to the processing unit, the optical phase modification element being controlled by optimizing a statistical parameter of at least a part of the image calculated by the processing unit.

2. The device according to claim 1, wherein the optical phase modification element is positioned in the object arm, for controlling the phase of the incident wave on the sample.

3. The device according to claim 2, wherein the interference device comprises a microscope objective in each of the arms, and the optical phase modification element is positioned on a pupil or an image of the pupil of the microscope objective of the object arm.

4. The device according to claim 1, wherein the optical phase deformation element is a deformable mirror.

5. The device according to claim 1, wherein the calculation of the image of the slice of the sample comprises the subtraction of at least two interference signals having a phase difference of $\pi$ and the optical phase modification element is controlled by optimizing the standard deviation measured on at least some of the values of the points of the image calculated in this way.

6. The device according to claim 5, wherein the calculation of the image of the slice of the sample additionally comprises the calculation of the absolute value of the aforementioned subtraction, and the optical phase modification element is controlled by optimizing the mean, the standard deviation or the contrast measured on at least some of the values of the points of the image calculated in this way.

7. The device according to claim 1, wherein the optimization of the statistical parameter comprises the measurement of the parameter for three states of the optical phase modification element corresponding to the introduction of three respective given values of an optical aberration.

8. The device according to claim 1, wherein the interference device is of the Linnik type, comprising a beam splitter element for forming the object and reference arms, and a microscope objective in each of the arms.

9. The device according to claim 1, wherein the interference device comprises a variable filter in one of its arms and a plate in the other arm to compensate the path length difference introduced by the variable density.

10. A method of incoherent light full field interference microscopy for the imaging of a volumetric scattering sample, comprising:
  emission of an incident wave having a given spectral band;
  optical interference between a reference wave obtained by reflection of the incident wave on a mirror of a reference arm of the interference device and an object wave obtained by backscattering of the incident wave by a slice of the sample at a given depth of said sample, the sample being placed in an object focal plane of a microscope objective placed in an object arm of the interference device;
  acquisition using a multichannel acquisition device, placed in a plane optically conjugated with said object focal plane of said microscope objective of the object arm, of at least a first interference signal and at least a second interference signal resulting from the interference of the reference and object waves, the at least two interference signals having a phase difference produced by varying the relative path length difference between the two arms of the interference device;
  processing of the first and second interference signals for calculating an image of the slice of the sample; and
  control of the phase of the wave incident on the sample by optimizing a statistical parameter of at least a part of the image calculated on the basis of the processing of the interference signals.

11. The method of microscopy according to claim 10, wherein the calculation of the image of the slice of the sample comprises the subtraction of at least two interference signals having a phase difference of $\pi$, and the phase of the wave incident on the sample is controlled by optimizing the standard deviation measured on at least some of the values of the points of the image.

12. The method of microscopy according to claim 11, wherein the calculation of the image of the slice of the sample additionally comprises the calculation of the absolute value of the aforementioned subtraction, and the phase of the wave incident on the sample is controlled by optimizing the mean, the standard deviation or the contrast measured on at least some of the values of the points of the image.

13. The method of microscopy according to claim 10, wherein the control of the phase of the wave incident on the sample comprises, for a given optical aberration, the measurement of a given number of values of the statistical parameter after the introduction of the same number of values of the optical aberration into the phase of the wave incident on the sample, where the calculation of the value of the aberration maximizes the value of the parameter, and the introduction of the value of the aberration into the phase of the wave incident on the sample.

14. The method of microscopy according to claim 13, wherein the number of values of the introduced optical aberration is three.

* * * * *